(12) United States Patent  
Oh

(10) Patent No.: US 8,411,225 B2
(45) Date of Patent: Apr. 2, 2013

(54) LIQUID CRYSTAL DISPLAY DEVICE

(75) Inventor: Guen Taek Oh, Busan (KR)

(73) Assignee: LG Display Co., Ltd., Seoul (KR)

( * ) Notice: Subject to any disclaimer, the term of this patent is extended or adjusted under 35 U.S.C. 154(b) by 101 days.

(21) Appl. No.: 12/882,674

(22) Filed: Sep. 15, 2010

(65) Prior Publication Data

US 2011/0063541 A1 Mar. 17, 2011

(30) Foreign Application Priority Data

Sep. 17, 2009 (KR) .................. 10-2009-0088258

(51) Int. Cl.
*G02F 1/1333* (2006.01)
(52) U.S. Cl. ........................................ 349/58
(58) Field of Classification Search .............. 349/58
See application file for complete search history.

(56) References Cited

U.S. PATENT DOCUMENTS

| 2004/0141102 A1* | 7/2004 | Lin ................... 349/58 |
| 2005/0168954 A1 | 8/2005 | Kim |
| 2007/0216825 A1* | 9/2007 | Hsu et al. ............. 349/58 |
| 2008/0100768 A1* | 5/2008 | Yang et al. ........... 349/58 |

FOREIGN PATENT DOCUMENTS

| JP | 2001-282112 | 10/2001 |
| JP | 2007-298736 | 11/2007 |
| JP | 2009-020229 | 1/2009 |
| JP | 2010-134128 | 6/2010 |

OTHER PUBLICATIONS

Office Action issued in corresponding Chinese Patent Application No. 201010287802.7, mailed Feb. 29, 2012.
Office Action issued in corresponding Japanese Patent Application No. 2010-207732, mailed Oct. 9, 2012.
Office Action issued in corresponding Chinese Patent Application No. 201010287802.7, mailed Dec. 25, 2012.

* cited by examiner

*Primary Examiner* — Richard Kim
(74) *Attorney, Agent, or Firm* — Brinks Hofer Gilson & Lione

(57) ABSTRACT

An LCD device is disclosed. The LCD device includes: a main support of a rectangular rim shape configured to receive a backlight; a liquid crystal display panel disposed on the main support; and first and second top cases disposed to respectively cover first and second portions of the main support and to be mutually discrete and separate from each other, wherein the first and second top cases contact with the main support and bury the liquid crystal display panel therein.

9 Claims, 3 Drawing Sheets

LIQUID CRYSTAL DISPLAY DEVICE

This application claims the benefit of Korea Patent Application No. 10-2009-0088258, filed on Sep. 17, 2009, the entire contents of which is incorporated herein by reference for all purposes as if fully set forth herein.

BACKGROUND

1. Field of the Invention

This disclosure relates to a liquid crystal display (LCD) device, and more particularly to an LCD device adapted to reduce manufacturing cost.

2. Discussion of the Related Art

Cathode ray tubes (CRTs) correspond to one of display devices which are widely used. The CRTs are mainly used as monitors for TVs, measuring apparatuses, information terminals, and so on. However, the heavy weight and large size of the CRTs have been a major hindrance to the manufacturing of small, light electronic products.

To address this matter, LCD devices are gradually being used in a wide range of applications due to their advantages such as luminance, thinness, and low power consumption. Furthermore, LCD devices are being manufactured to have even larger screens, be thinner, and consume less power, in order to meet requirements of users. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing light necessary to display an image.

The backlight unit is configured to include a light source unit disposed on an inner side surface of a bottom cover which is formed from metal material. The backlight unit is further configured to include a reflection sheet, a light guide plate, and optical sheets stacked inside the bottom cover.

Such an LCD device includes an LCD module with the LCD panel disposed on the backlight unit. The LCD panel is combined with the backlight unit by engaging a top case of a metal material and the bottom cover of the backlight unit, thereby completing the assembling of the LCD module. The top case is formed to encompass the upper surface edges of the LCD panel.

The assembled LCD module is combined with upper and lower system cases which encompass the top case and the bottom cover, respectively. Also, a driving system configured to drive the LCD module is installed within the lower system case, thereby providing a completed LCD device suitable for being used by users.

However, the LCD module is complexly configured. Moreover, the top case encompassing the LCD panel, the upper and lower system cases encompassing the upper and lower portions of the LCD module, and so on must be included in the LCD device. As such, the configuration of the ordinary LCD device is very complex. Therefore, manufacturing cost of the ordinary LCD device become larger.

BRIEF SUMMARY

According to one general aspect of the present embodiment, an LCD device includes: a main support of a rectangular rim shape configured to receive a backlight; a liquid crystal display panel disposed on the main support; and first and second top cases disposed to respectively cover first and second portions of the main support and to be mutually discrete and separate from each other, wherein the first and second top cases contact with the main support and bury the liquid crystal display panel therein.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the disclosure and together with the description serve to explain the disclosure. In the drawings.

DETAILED DESCRIPTION OF THE DRAWINGS AND THE PRESENTLY PREFERRED EMBODIMENTS

Figure 1:
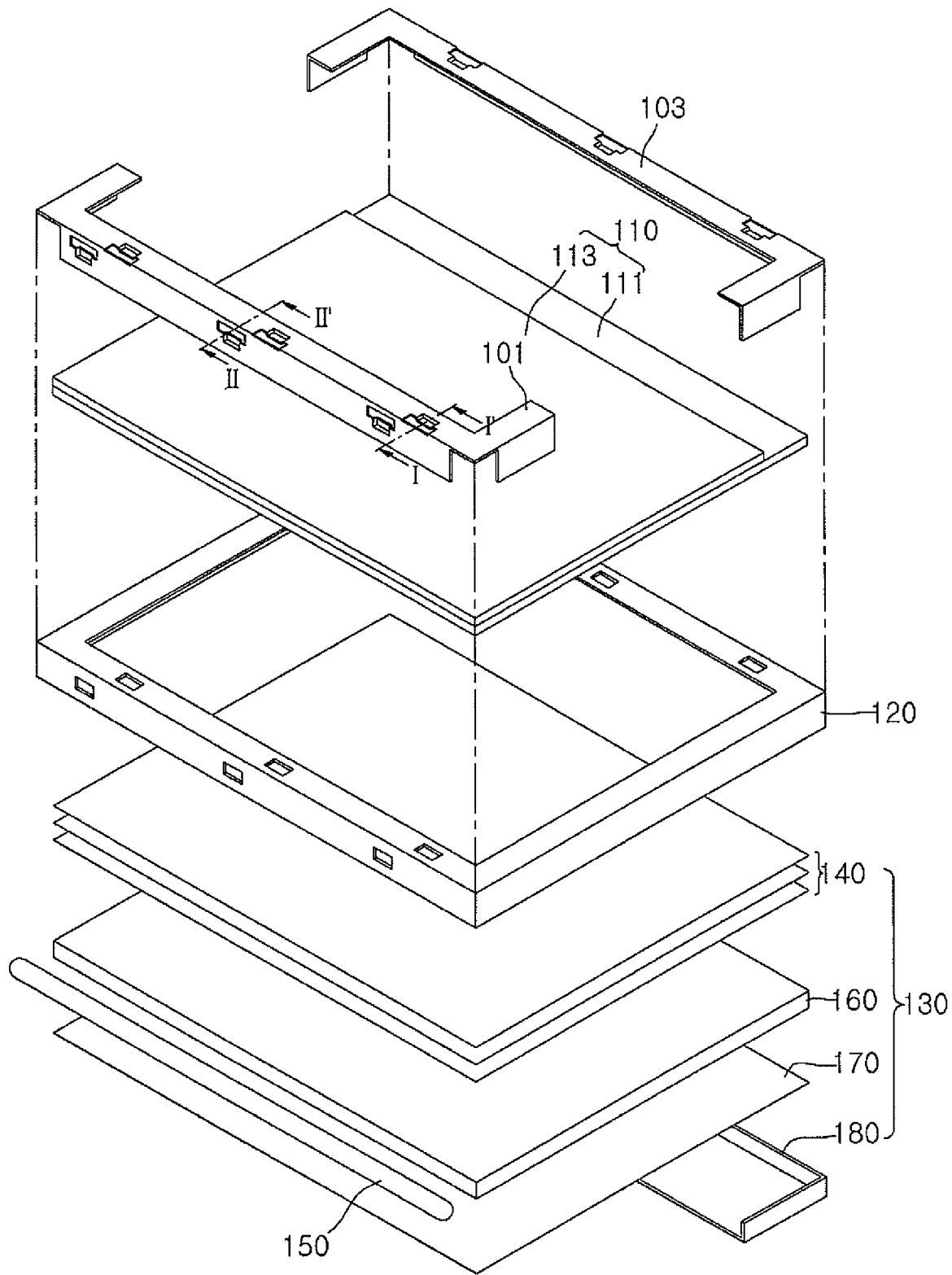
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
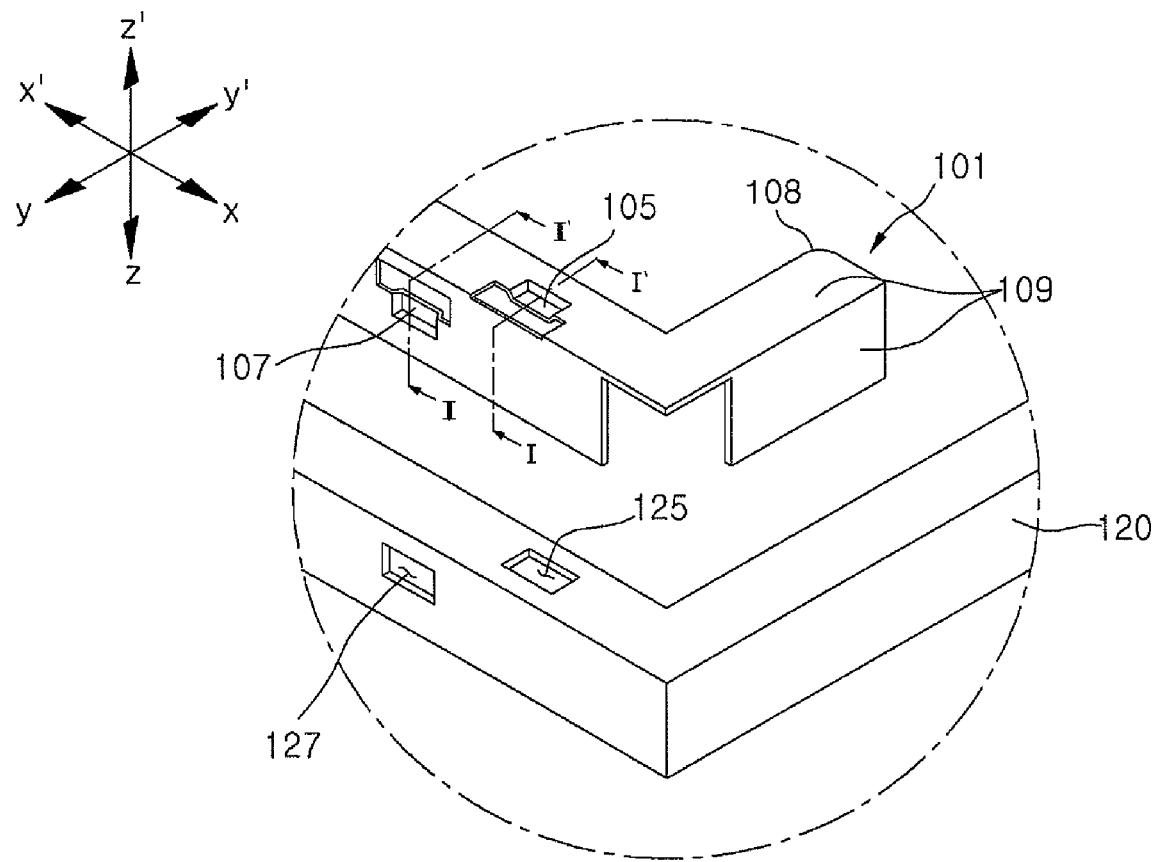
FIG. 2 is a perspective view showing the top case and the main support in FIG. 1.
Figure 3:
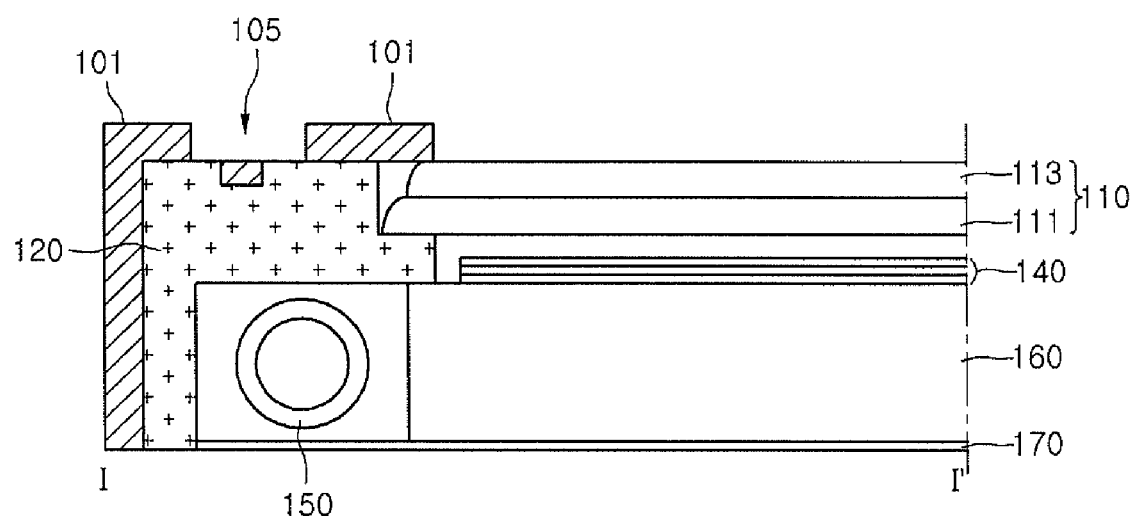
FIG. 3 is a cross-sectional view showing the LCD device taken along a line I-I' in FIG. 1.
Figure 4:
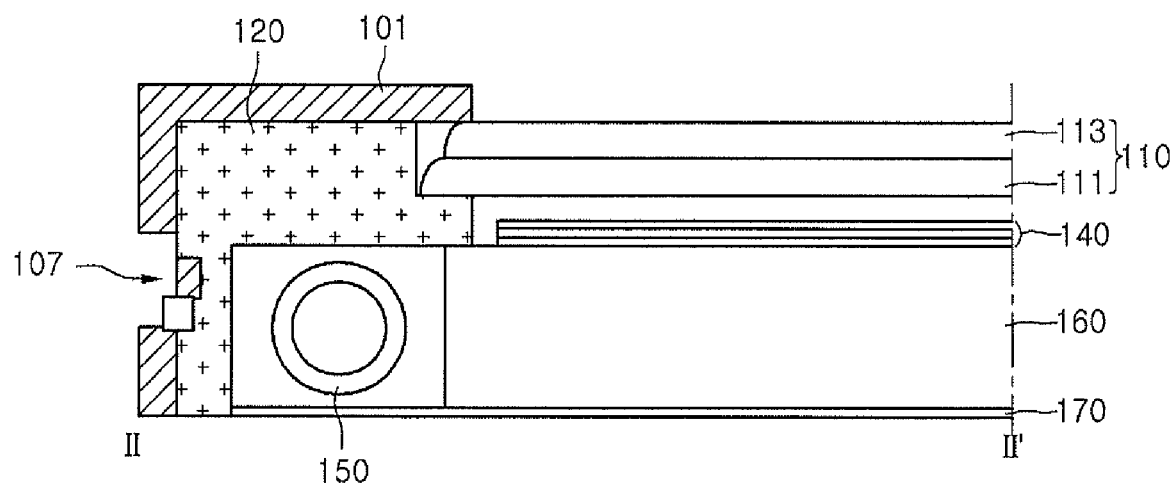
FIG. 4 is a cross-sectional view showing the LCD device taken along another line II-II' in FIG. 1.

FIG. 1 is a disassembled perspective view showing an LCD device according to an embodiment of the present disclosure. FIG. 2 is a perspective view showing the top case and the main support in FIG. 1. FIG. 3 is a cross-sectional view showing the LCD device taken along a line I-I' in FIG. 1. FIG. 4 is a cross-sectional view showing the LCD device taken along another line II-II' in FIG. 1.

Referring to FIGS. 1 through 4, the LCD device according to an embodiment of the present disclosure includes an LCD panel 110 configured to display images, and a backlight unit 130 disposed under the LCD panel 110 and configured to apply light to the LCD panel 110. The LCD device further includes a first top case 101 configured to be in contact with one edge of the LCD panel 110 and a second top case 103 configured to be in contact with the other edge, opposite to the spot that the first top case 101 contacts the LCD panel 110. The first top case 101 and the second top case 103 are mutually discrete and separate from each other.

The LCD panel 110 includes a thin film transistor substrate 111 and a color filter substrate 113 disposed against each other and combined to maintain a uniform cell gap between them, providing a liquid crystal layer (not shown) interposed between the two substrates. Although they are not shown in detail in the drawings, the thin film transistor substrate 111 and the color filter substrate 113 will now be described. The thin film transistor substrate 111 includes a plurality of gate lines and a plurality of data lines formed to cross each other, and a plurality of thin film transistors formed at the intersections of the plurality of gate lines and the plurality of data lines. The plurality of gate lines and the plurality of data lines crossing each other define the pixels. The thin film transistors are connected to each pixel electrodes included in the pixels, respectively. On the other hand, the color filter substrate 113 includes: red, green, and blue color filters opposite to the pixels; a black matrix rimmed each of the color filters; and a common electrode formed to cover the color filters and the black matrix. The black matrix shields the gate lines, the data lines, and the thin film transistors.

The LCD device further includes a gate driver (not shown) and a data driver (not shown) disposed by the sides of the LCD panel 110. The gate driver is connected to the gate lines, in order to sequentially apply a scan signal to the gate lines on the LCD panel 110. The data driver is connected to the data lines, in order to apply data signals to the data lines on the LCD panel 110. To this end, the gate and data drivers are electrically connected to the LCD panel 110 by means of tabs which are configured in a tape carrier package (TCP).

The LCD device still further includes a main support 120 formed from a molded material in a rectangular rim shape. The main support 120 receives the backlight unit 130 and supports the LCD panel 110.

The backlight unit 130 includes a light source 150 disposed on an inner side of the main support 120 and configured to emit light, and a light guide plate 160 disposed next to the light source 150 and configured to convert linear or spotted light into two-dimensional light. The backlight unit 130 further includes optical sheets 140 disposed on the light guide plate 160 and configured to scatter and converge light from the light guide plate 160, and a reflection sheet 170 disposed under the light guide plate 160 configured to reflect light downwardly progressing from the light guide plate 160 toward the LCD panel 110. The backlight unit 130 still further includes a bottom cover 180 disposed on a part of the lower surface of the reflection sheet 170.

The light guide plate 160 is formed from poly methyl methacrylate (PMMA). Although it is not shown in the drawings, the light guide plate 160 can be formed in a wedge shape. The light guide plate 160 becomes thinner the further away it is from an incident surface on which the light source 150 is disposed. The light guide plate 160 includes a prism pattern formed on its rear surface. The prism pattern is used to refract incident light toward the optical sheets 140.

The optical sheet 140 includes a diffusion sheet, a converging sheet, and protective sheet. The diffusion sheet scatters light. The converging sheet is used to converge light. The protective sheet is used to protect the converging sheet.

Although it is not shown in the drawings, the light source 150 can include a lamp or at least one light emission diode (LED). The light source 150 may further include a light guider disposed to encompass the lamp or at least one LED. The light guider reflects light emitted from the lamp or at least one LED toward the light guide plate 160.

The first and second top cases 101 and 103 are separate from each other and respectively disposed on two opposite sides of the LCD panel 100 parallel to a major axis {A label number for major axis is suggested to complete and clarify more the disclosure}. In other words, the first top case 101 is disposed on a first edge of the LCD panel 110, and the second top case 103 is disposed on a second edge of the LCD panel 110 opposite to the first edge.

The first and second top cases 101 and 103 are disposed to be in contact with the two opposite edges of the LCD panel 110. Furthermore, the first and second top cases 101 and 103 respectively contacts a first side and a second side of the main support 120 which are opposite to each other and parallel to the major axis direction of the LCD panel 110. As such, the inner surfaces of the first and second top cases 101 and 103 come in surface contact with the first and second side surfaces of the main support 120.

As shown in FIG. 2, each of the first and second top cases 101 and 103 includes a plurality of first protrusions 105 arranged at a fixed interval on their upper surfaces and formed to protrude inward in a direction to the LCD panel 110. Also, each of the first and second top cases 101 and 103 includes a plurality of second protrusions 107 arranged at the fixed interval on their side surfaces and formed to protrude inward in a direction to the LCD panel 110 from the their side surfaces The first and second protrusions 105 and 107 may be formed in a hook shape. Also, the first and second protrusions 105 and 107 may be disposed in a single body united with the first and second top cases 101 and 103 when the first and second top cases 101 and 103 are manufactured by a molding process.

The main support 120 includes a plurality of first locking recesses 125 formed to receive the corresponding first protrusions 105. The plurality of first locking recesses 125 are formed at the fixed interval on the upper surface of the main support 120 and each of the first locking recesses 125 aligns with the corresponding first protrusions 105. The first locking recess 125 is formed in the same shape as the end portion of the first protrusion 105. As such, the first protrusion 105 can be locked in the first locking recess 125, so as to prevent the first and second cases 101 and 103 on the main support 120 from moving in a first direction y-y' (i.e., a minor axis direction of the LCD panel 110).

The main support 120 further includes a plurality of second locking recesses 127 formed to receive the corresponding second protrusions 107. The plurality of second locking recesses 127 are formed at the fixed interval on the side surface of the main support 120 and each of the second locking recesses 127 aligns with the corresponding second protrusion 107. The second locking recess 127 is formed in the same shape as the end portion of the second protrusion 107. In accordance therewith, the second protrusion 107 can be locked in the second locking recess 127, in order to prevent the first and second cases 101 and 103 on the main support 120 from moving in a second direction z-z' (i.e., a thickness direction of the LCD panel 110).

The first and second locking recesses 125 and 127 are simultaneously formed in the main support 120 when the main support is manufactured through an injection molding process.

The first and second top case 101 and 103 each include fixing wings 109 configured to be formed at both ends. The side surface of the main support 120 lies between both ends and the fixing wings 109 are formed to be configured to prevent their length direction movement. Furthermore, the fixing wings 109 can contact with the upper surface of the main support 120 and comprise two opposite ends of each of the first top cases 101 and the second top cases 103, thus provide an angle between the two opposite ends. The fixing wings 109 of the first and second top cases 101 and 103 can be formed by bending the two opposite ends of the first and second top cases 101 and 103 thus fitting the angle to the main support 120. Also, the fixing wings 109 can be disposed in a single body united with the top cases 101 and 103 when the top cases 101 and 103 are manufactured through the injection molding process. Such fixing wings 109 are used to prevent the first and second top cases 101 and 103 on the main support 120 from moving in a third direction x-x' (i.e., a major axis direction of the LCD panel 110).

Each of the fixing wings 109 is configured to include a rounded portion 108. More specifically, the rounded portions 108 are formed in contact with the upper surface edges of the LCD panel 110. Such rounded portions 108 function to prevent the damages of the LCD panel 110 which can be caused by friction between the LCD panel 110 and the first and second top cases 101 and 103. In other words, the rounded portions 108 are used to minimize the damage of the LCD panel 110 which is caused by the first and second top cases 101 and 103 when they are mounted to or separated from the LCD panel 110. Also, the rounded portions 108 are simultaneously formed when the top cases 101 and 103 are manufactured through the injection molding process.

The LCD device of the present disclosure is described to embody the structure that the first and second protrusions 105 and 107 on both the first and second cases 101 and 103 are locked to the first and second locking recesses 125 and 127 on the main support 120, but it is not limited to this. In other words, the combined structure of the top cases 101 and 103 with the main support 120 can be modified according to the specifications of the LCD device. If the LCD device includes a bottom cover configured to encompass at least two side surfaces of the main support 120, a plurality of through holes formed on at least two sidewalls of the bottom cover are needed. In this case, the second protrusion 105 is locked to the second locking recesses 127 on the main support 120 via the through hole on the bottom cover.

As described above, the LCD device according to an embodiment of the present disclosure is configured in the structure that the separated first and second top cases 101 and 103 are disposed on both lengthened sides of the main support and LCD panel 110 parallel to the major axis. Such first and second top cases 101 and 103 can be disposed in smaller volume than an ordinary top case disposed in a single body. As such, a material cost can be decreased, and furthermore a distribution cost can be also decreased.

Also, the first and second top cases 101 and 103 may be formed in the same shape. As such, the first and second top cases 101 and 103 may be manufactured by the same mold. Therefore, their manufacturing costs can be decreased.

Consequently, the first and second top cases 101 and 103 reduces the manufacturing, material, and distribution costs of at least 50% in comparison with the ordinary top case. Therefore, the manufacturing costs of the LCD device can be reduced.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A liquid crystal display device comprising:
a support main of a rectangular rim shape configured to receive a backlight;
a liquid crystal display panel disposed on the support main; and
first and second top cases disposed to respectively cover first and second portions of the support main and to be mutually discrete and separate from each other, wherein the first and second top cases contact with the support main and bury the liquid crystal display panel there in between;
wherein each of the first and second top cases includes fixing wings formed at their both ends and configured to prevent their length direction movement;
wherein each of the fixing wings includes a rounded portion formed in contact with upper surface edges of the liquid crystal display panel, and configured to protect a damage of the liquid crystal display panel.

2. The liquid crystal display device claimed as claim 1, wherein each of
the first and second top cases comprises a plurality of first protrusions and a plurality of second protrusions, which are formed respectively protruding toward a direction where the liquid crystal display panel lies and suitable to be locked to the support main.

3. The liquid crystal display device claimed as claim 2, wherein the support main is configured to include a plurality of first locking recesses on regions of its upper surface opposite to the first protrusions and the first locking recesses are formed in the same shape as an end portion of the first protrusions.

4. The liquid crystal display device claimed as claim 2, wherein the support main is configured to include a plurality of second locking recesses on regions of its side surface opposite to the second protrusions and the second locking recesses are formed in the same shape as an end portion of the second protrusions.

5. The liquid crystal display device claimed as claim 2, wherein first and second protrusions are formed in a single body with the first and second top cases.

6. The liquid crystal display device claimed as claim 1, wherein the first and second top cases come in surface contact with upper and side surfaces of the support main, comprised by each of the first and second portions.

7. The liquid crystal display device claimed as claim 1, wherein the fixing wings further contact with the upper surface of the support main.

8. The liquid crystal display device claimed as claim 1, wherein the fixing wings are formed in a single body with the first and second top cases.

9. The liquid crystal display device claimed as claim 1, wherein the fixing wings are extended to support main in order to prevent their length direction movement.

* * * * *